United States Patent
Monteiro et al.

(10) Patent No.: US 10,235,760 B2
(45) Date of Patent: Mar. 19, 2019

(54) DEVICE, SYSTEM AND METHOD FOR DIGITALLY MODELING ROCK SPECIMENS

(71) Applicant: Vektore Exploration Consulting Corporation, Toronto (CA)

(72) Inventors: Rogerio Noal Monteiro, Etobicoke (CA); Dagoberto Assis, London (CA); Joao Luis Silva Vieira, Fortaleza (BR); Jian Yao, Markham (CA); Maximiliano dos Santos Gomes Pinto, Jacarei—SP (BR); Thiago da Cunha Cavalcanti Oliveira, Jaboatão dos Guararapes (BR)

(73) Assignee: Vektore Exploration Consulting Corporation, Toronto, Ontario (CA)

( * ) Notice: Subject to any disclaimer, the term of this patent is extended or adjusted under 35 U.S.C. 154(b) by 176 days.

(21) Appl. No.: 15/451,226

(22) Filed: Mar. 6, 2017

(65) Prior Publication Data
US 2018/0253851 A1    Sep. 6, 2018

(51) Int. Cl.
*G06K 9/00*    (2006.01)
*G06T 7/12*    (2017.01)
(Continued)

(52) U.S. Cl.
CPC .............. *G06T 7/12* (2017.01); *G01V 99/005* (2013.01); *G06K 9/2036* (2013.01)

(58) Field of Classification Search
None
See application file for complete search history.

(56) References Cited

U.S. PATENT DOCUMENTS

| 8,725,477 B2* | 5/2014 | Zhang | E21B 49/00 703/10 |
| 2017/0234769 A1* | 8/2017 | Rasnik | G01B 11/08 356/73.1 |

OTHER PUBLICATIONS

"Structural Vectoring in Mineral Exploration: What It is and How, When and Why We Should Use It" (Monteiro. http://vektore.com/2016/02/18/structural-vectoring-in-mineral-exploration-what-it-is-and-how-when-and-why-we-should-use-it/).

(Continued)

*Primary Examiner* — Wei Wen Yang
(74) *Attorney, Agent, or Firm* — Gilbert's LLP; Matthew Powell

(57) ABSTRACT

Disclosed is a device for capturing digital images of a rock specimen in a region of interest. The device includes an inner chamber having a wall surrounding the region of interest, the chamber having a specimen support structure at the bottom of the region of interest and an open top opposite the specimen support structure, the specimen support structure dimensioned to receive and support an elongate core sample in an upright orientation within the region of interest; an imaging system associated with the chamber and comprising multiple digital imaging devices spaced around the region of interest, each digital imaging device oriented to have a respective field of view encompassing the region of interest; an illumination system associated with the chamber and switchable between a first illumination state and a second illumination state and comprising a plurality of illumination sources spaced around the region of interest, the illumination sources operable to direct intersecting illumination patterns into the region of interest; and a control system coordinating the imaging system and the illumination system to capture a first set of digital images during the first illumination state and a second set of images during the (Continued)

second illumination state. Systems, methods and computer-readable media are also disclosed.

22 Claims, 13 Drawing Sheets

(51) Int. Cl.
*G01V 99/00* (2009.01)
*G06K 9/20* (2006.01)

(56) References Cited

OTHER PUBLICATIONS

"A Portable Core Imaging Scanner" (Kofman, Duerksen and Schmitt, University of Alberta, Edmonton, Alberta, Canada—2012).

* cited by examiner

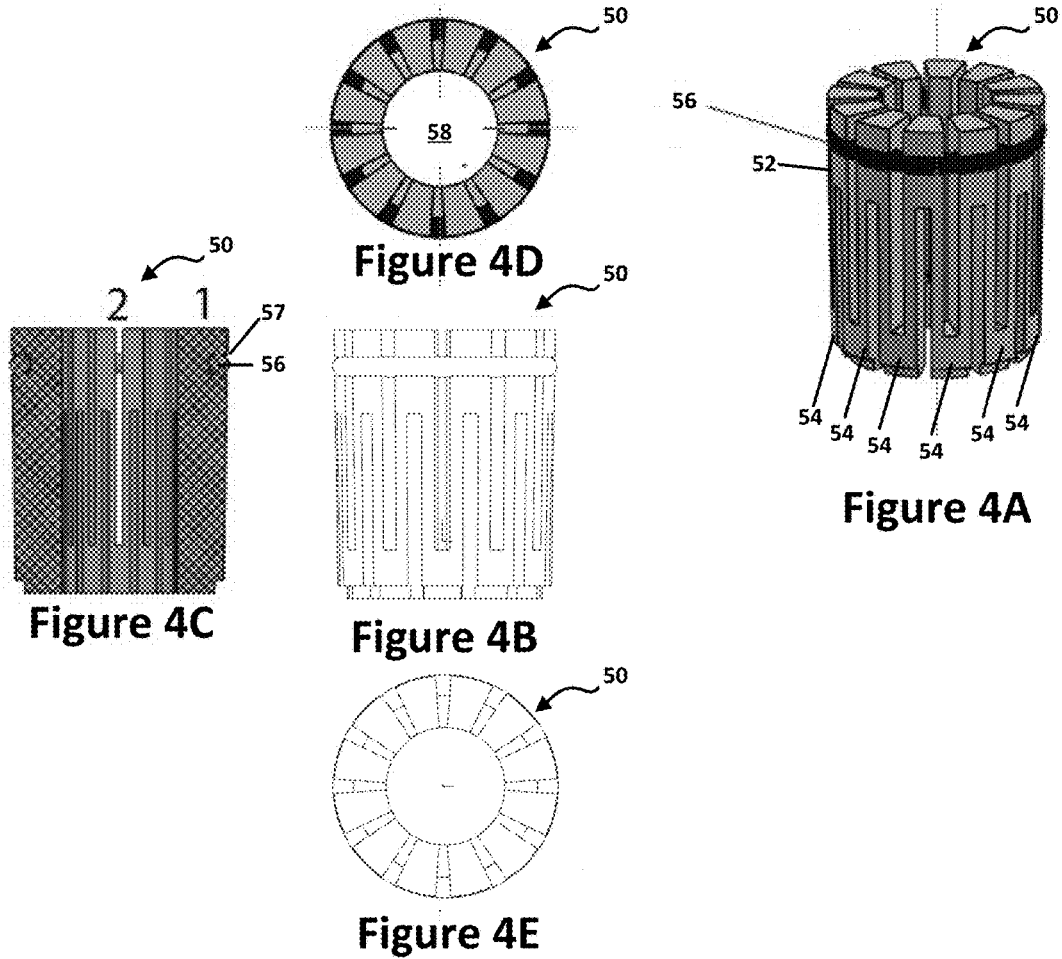

DEVICE, SYSTEM AND METHOD FOR DIGITALLY MODELING ROCK SPECIMENS

FIELD OF THE INVENTION

The following relates generally to three-dimensional modeling, and more particularly to devices, systems and methods for capturing digital images of a rock specimen such as a core sample and producing a three-dimensional digital model therefrom, and enabling manipulation of the model by a user such as a geologist.

BACKGROUND OF THE INVENTION

In mineral exploration, drilling is the critical and expensive operation of obtaining rock specimens such as core samples from a geological body. Once obtained, the rock specimens are studied in numerous ways for indications that there may be valuable, retrievable mineral deposits in the geological body.

A large number of core samples are typically extracted from a particular geological body in order to provide useful indications of the mineral contents contained within the body. Typically, a given core sample extracted from a geological body is initially an elongate, generally-cylindrical rock specimen of a few centimeters in diameter and several centimeters long. Upon extraction, the core sample is uniquely identified and very often further "sampled" by splitting the generally-cylindrical core sample into, for example, a number of half- and/or quarter- and/or three-quarter cylinders. The individual samples of an initial core sample are then distributed to one or more laboratories for geochemical and/or geometallurgical analysis, as well as to one or more geologists for geological and/or geophysical study and analysis. For example, structurally relevant core samples and pieces thereof form the foundation of Structural Vectoring®—a process of understanding a mineral body using structural geological analysis, as described in "Structural Vectoring In Mineral Exploration: What It Is And How, When and Why We Should Use It" (Monteiro, http://vektore.com/2016/02/18/structural-vectoring-in-mineral-exploration-what-it-is-and-how-when-and-why-we-should-use-it/).

As a result of analyses of the individual samples, plotted maps/sections are created for a given core sample and/or a three-dimensional model is made of the core sample for visualization and statistical analysis. Geologists generate this information from several extracted core samples and use it to produce a mineral resource analysis for the geological body. Such an analysis may include the configuration or design of mineral bodies within the overall geological body being investigated, as well as the volume and grade distributions.

Because the physical core samples themselves embody a great deal of information, they serve as a significant resource to the mining operation, particularly for validation and auditing. Mining operations invest considerable resources to store, preserve and make core samples available during a given project and for future ventures. The extracted and analyzed core samples pieces that remain onsite, being central to the mineral resource analysis, are catalogued, physically stored in boxes, and stacked in core farms so that they may be physically accessed repeatedly for further analysis and/or site audits. As for further analysis, often geologists overlook important geological features during a first pass or even a main logging stage of a project or an audit.

Traditionally, if further work with the core samples were to be required, the geologists had to be physically present at the core farm to handle and study the samples in person. Many exploration sites are in remote locations, and it can be expensive and time consuming for geologists to always be present onsite.

In order to reduce some of the effort, time and expense of geologists having to be physically onsite to study core samples, some mining operations have been employing core sample scanners to digitally capture images of core samples. The digital images can then be electronically shared with the geologists in different locations. One example of a commercially-available core sample scanner is the CoreScan 3 offered by the DMT Group. The CoreScan 3, described at the website http://www.dmt-group.com/en/products/geo-measuring-systems/dmt-corescan.html, is configured as a table-top kiosk unit with an open lower table portion and an upper imager portion for imaging objects placed onto the open table portion. The table portion can receive core samples for flat (two-dimensional) scanning of core samples. For three-dimensional scanning, the table portion also includes mechanical rollers that can both support and roll a heavy cylindrical core sample about a horizontal axis while the imager portion captures image data of all sides of the core sample from above. A downstream processing unit is configured with appropriate software for processing the captured image data to create a three-dimensional model of the cylindrical core sample for study and analysis. According to the published specifications of the CoreScan 3, the unit has a length of 1.36 meters, a height of 1.28 meters, and a weight of 128 kilograms.

While the CoreScan 3 is a useful tool, its size and weight limit where and when it can be used. As explained in the publication entitled "A Portable Core Imaging Scanner" (Kofman, Duerksen and Schmitt, University of Alberta, Edmonton, Alberta, Canada—2012), one reason that core imaging has not been more accepted is that the available equipment is relatively bulky such that its use is not usually practical. Research sites are often remote and rugged, potentially limiting the amount and types of equipment that can be brought onsite by investigators for data acquisition and analysis. The Kofman et al. paper proposes a similar, roller-based core sample scanner for receiving horizontally-oriented cylindrical core samples, and offers that constructing such a device using aluminum for some components would provide a superior cost and strength to weight ratio, thereby perhaps making it less difficult to get into the more remote and rugged sites.

The CoreScan 3 and the device proposed by the Kofman et al. paper include several moving parts in order to enable them to physically support and roll core samples for imaging. With high-volume core sample scanning operations, rollers, bearings, motors and other such moving parts exposed to dust, rock fragments and frequent use are of course subject to failure. If a scanner having such parts is required to be moved to a different location, the moving parts are also at risk of being knocked out of alignment. As such, maintenance costs of such physically-complex units can be significant. Furthermore, components such as motors, bearings and rollers suited to physically supporting often-times heavy core samples will typically be constructed with steel. They will therefore contribute greatly to overall weight, despite the weight savings from using lighter materials such as aluminum for other components.

In addition, core sample scanners that employ horizontal rollers to support and roll cylindrical core samples during imaging do not easily accommodate non-cylindrical core samples such as the half-cylinder, three-quarter cylinder, or quarter-cylinder samples into which an originally-cylindrical core sample can be divided. As would be understood, rolling a non-cylindrical core sample would result, essentially, in uncontrolled tumbling of the core sample during attempted rotation, making it very difficult to capture images suitable for forming a useful three-dimensional model. Because of this, if a three-dimensional scan of a non-cylindrical core sample is required, the technician using the core sample scanner must get quite involved by manually manipulating the core sample instead of allowing it to tumble freely. This manual manipulation tends to significantly lengthen the scanning time, reducing the efficiency of the overall operation. As such, improvements are desirable.

SUMMARY OF THE INVENTION

In accordance with an aspect, there is provided a device for capturing digital images of a rock specimen in a region of interest, the device comprising: an inner chamber having a wall surrounding the region of interest, the chamber having a specimen support structure at the bottom of the region of interest and an open top opposite the specimen support structure, the specimen support structure dimensioned to receive and support an elongate core sample in an upright orientation within the region of interest; an imaging system associated with the chamber and comprising multiple digital imaging devices spaced around the region of interest, each digital imaging device oriented to have a respective field of view encompassing the region of interest; an illumination system associated with the chamber and switchable between a first illumination state and a second illumination state and comprising a plurality of illumination sources spaced around the region of interest, the illumination sources operable to direct intersecting illumination patterns into the region of interest; and a control system coordinating the imaging system and the illumination system to capture a first set of digital images during the first illumination state and a second set of images during the second illumination state.

In embodiments, the specimen support structure is configured to enable a long core sample to be supported in an initial position and, after an initial set of images is captured, turned end-over-end or slid lengthwise downwards to put another portion of the core sample within the fields of view of the digital imaging devices. During use of such embodiments of the device, the device is preferably supported on a table that itself has a hole in coaxial alignment with the specimen support structure so as to allow the core sample to be slid downwards within the specimen support structure to extend beneath the device and through the hole in the table.

In accordance with another aspect, a system for generating a three-dimensional digital model comprises the device; and a computing system configured for receiving the first and second sets of digital images and for: generating a point cloud corresponding to the core sample, comprising: generating a first subset of points by stereo matching using corresponding features within respective pairs of images in the first set; generating a second subset of points by triangulating intersection points of intersecting illumination patterns in the images in the first set; in the event that the number and distribution of generated points within one or more segments defined by intersecting illumination patterns does not accord with number and distribution of generated points within one or more adjacent segments, generating a third subset of points within the one or more segments using the first set of images; and combining the subsets of points as the point cloud; and mapping the images in the second set to a geometric structure defined by the point cloud thereby to form a three-dimensional model of the core sample. In accordance with another aspect, there is provided a method of capturing data from a rock specimen, the method comprising: projecting, from a plurality of directions, intersecting illumination patterns onto the rock specimen; during the projecting, capturing a first set of digital images of the rock specimen from a plurality of perspectives; and de-activating the projecting and capturing a second set of digital images of the rock specimen from the plurality of perspectives.

In accordance with another aspect, there is provided a method of capturing data from a rock specimen in a region of interest, the method comprising: receiving and supporting an elongate core sample in an upright orientation within the region of interest; projecting, from a plurality of directions, intersecting illumination patterns onto the core sample; during the projecting, capturing a first set of digital images of the core sample from a plurality of perspectives; de-activating the projecting and capturing a second set of digital images of the core sample from the plurality of perspectives; and storing the first and second sets of digital images in association with each other.

In an embodiment, the elongate core sample, after first and second initial sets of images are captured, may be received and supported in an upside-down upright orientation within the region of interest; and the projecting, capturing, de-activating, capturing and storing steps are conducted with respect to the elongate core in the upside-down upright orientation.

According to another aspect, there is provided a method for processing data captured from a rock specimen, the data comprising a first set of images of the rock specimen captured while intersecting illumination patterns was being projected onto the rock specimen and a second set of images of the rock specimen without the illumination patterns, the method comprising: generating a point cloud corresponding to the rock specimen, comprising: generating a first subset of points by stereo matching using corresponding features within respective pairs of images in the first set; generating a second subset of points by triangulating intersection points of intersecting illumination patterns in the images in the first set; in the event that the number and distribution of generated points within one or more segments defined by intersecting illumination patterns does not accord with number and distribution of generated points within one or more adjacent segments, generating a third subset of points within the one or more segments using the first set of images; and combining the subsets of points as the point cloud; and mapping the images in the second set to a geometric structure defined by the point cloud thereby to form a three-dimensional model of the rock specimen.

In accordance with another aspect, there is provided a non-transitory computer readable medium embodying a computer program executable on a computing system for processing data captured from a rock specimen, the data comprising a first set of images of the rock specimen captured while intersecting illumination patterns was being projected onto the rock specimen and a second set of images of the rock specimen without the illumination patterns, the computer program comprising: computer program code for generating a point cloud corresponding to the rock specimen, comprising: generating a first subset of points by stereo matching using corresponding features within respective pairs of images in the first set; generating a second subset of points by triangulating intersection points of intersecting illumination patterns in the images in the first set; in the event that the number and distribution of generated points within one or more segments defined by intersecting illumination patterns does not accord with number and distribution of generated points within one or more adjacent segments, generating a third subset of points within the one or more segments using the first set of images; and combining the subsets of points as the point cloud; and computer program code for mapping the images in the second set to a geometric structure defined by the point cloud thereby to form a three-dimensional model of the rock specimen.

The devices, methods and computer readable media of the present invention enable rapid capture of digital images of a rock specimen such as a core sample and the efficient processing of the digital images to produce a three dimensional model of the core sample, referred to herein as a virtual core. A virtual core stored as part of a virtual core library can easily be accessed remotely and repeatedly, as a truthful representation of its physical counterpart, for visual inspection, study, auditing, and future evaluation.

Other aspects and advantages will be apparent from the following description and from the drawings.

BRIEF DESCRIPTION OF THE DRAWINGS

Embodiments of the invention will now be described with reference to the appended drawings in which:

FIG. 4A is a perspective view of a specimen support structure for positioning at the bottom of the region of interest within the device, according to an embodiment;

FIG. 4B is a front elevation view of the specimen support structure of FIG. 4A, depicted without surface texture;

FIG. 4C is a front sectional view of the specimen support structure of FIG. 4A, taken from the line A-A in FIG. 4B;

FIG. 4D is a top view of the specimen support structure of FIG. 4A;

FIG. 4E is a bottom view of the specimen support structure of FIG. 4A, depicted without surface texture;

DETAILED DESCRIPTION

Figure 1:
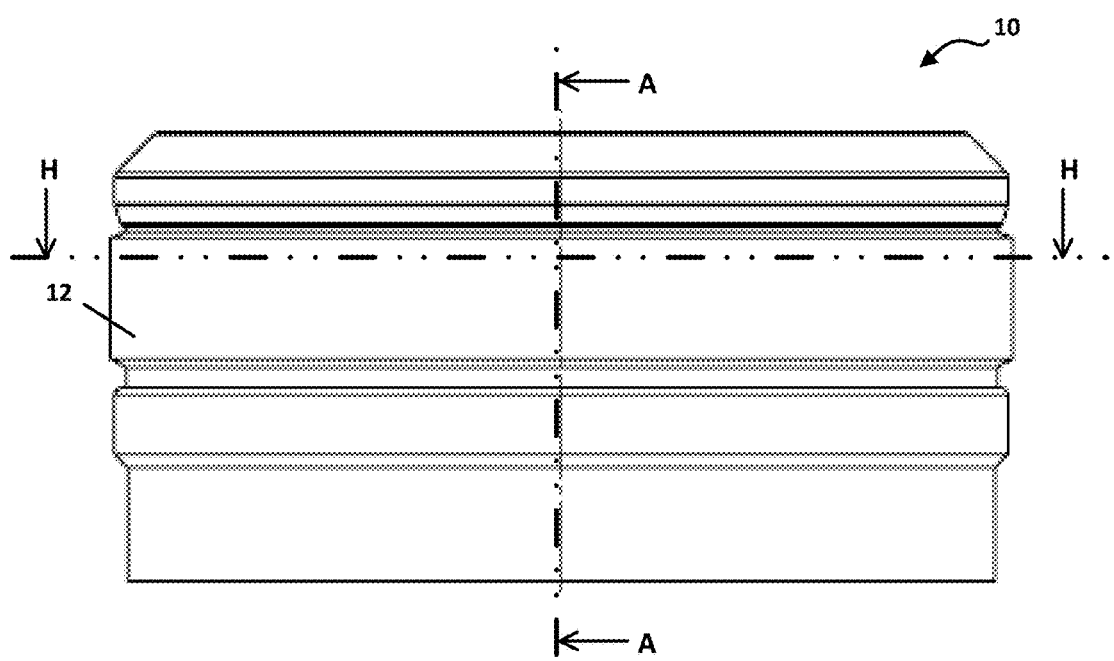
FIG. 1 is a front elevation view of a device for capturing digital images of a rock specimen in a region of interest, according to an embodiment.
Figure 2:
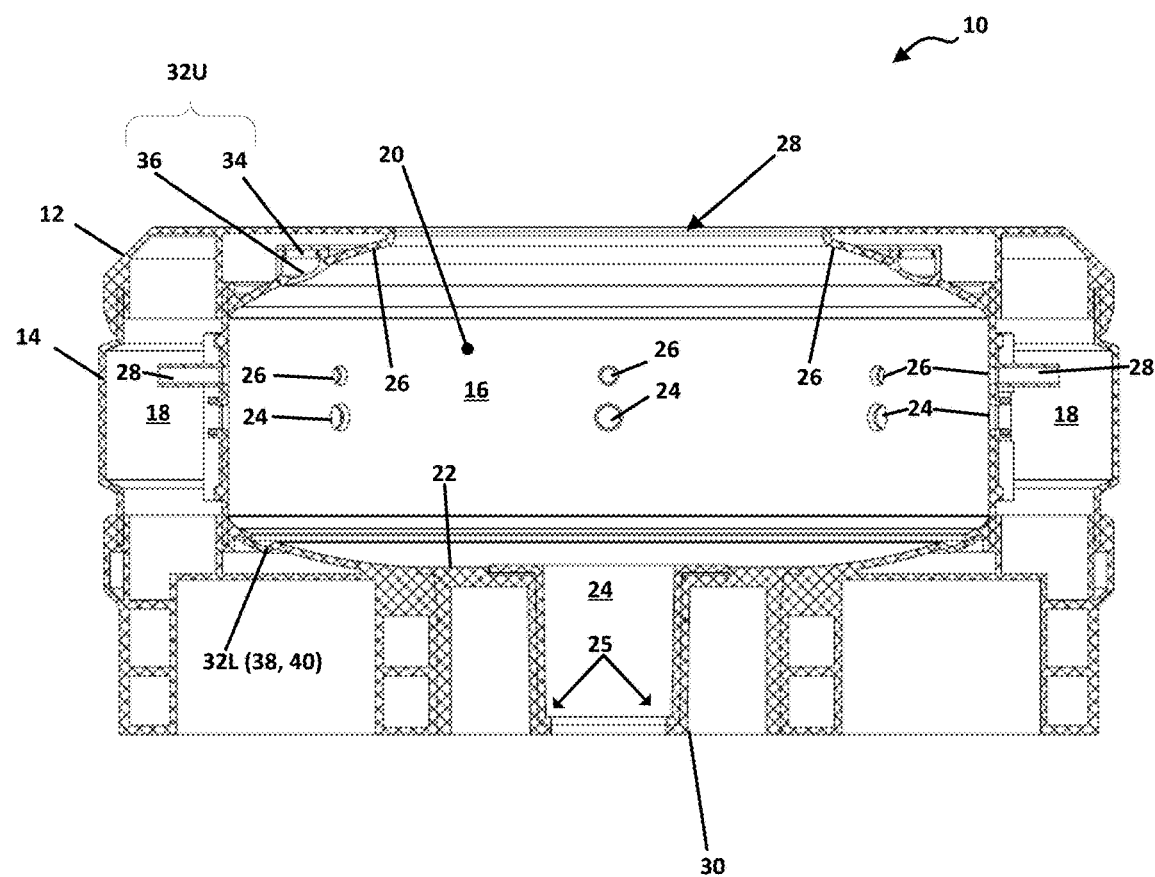
FIG. 2 is an enlarged sectional view of the body of the device of FIG. 1, taken from the line A-A in FIG. 1.

Disclosed herein is a device for capturing digital images of a rock specimen in a region of interest. FIG. 1 is a front elevation view of such a device 10, according to an embodiment. FIG. 2 is an enlarged sectional view of the body of the device 10, taken from the line A-A in FIG. 1.

The main body of device 10 is primarily a frame 12 that includes various substructures for supporting components of device 10 and a rock specimen being imaged. In this embodiment, frame 12 is generally cylindrical, has an overall height of about 33.5 centimeters and an outer diameter of about 67 centimeters.

In this embodiment, frame 12 is constructed from several interconnecting portions that are assembled together with the other components of device 10 during manufacture. The interconnecting portions may selectively be physically disconnected from each other as desired in order to gain access to electronic or other components for calibration and/or maintenance of device 10. This also eases the process of repair of any portions of device 10 that might occasionally become damaged due to heavy use in the field, rather than requiring wholesale replacement of device 10 in the event of a single component or single frame portion failure.

In this embodiment, frame 12 is configured to form an exterior wall 14 and an inner wall 16 spaced inwardly from the outer wall 14. An annular region 18 formed between the generally-cylindrical exterior wall 14 and the general-cylindrical inner wall 16 is sized and configured to receive and support electronic components of device 10, as will be described.

Inner wall 16 forms the periphery of a generally cylindrical inner chamber 20 that surrounds the region of interest. In this embodiment, the diameter of the inner chamber 20 is about 50 centimeters.

The region of interest (ROI) is a three-dimensional volume within the inner chamber 20 in which a rock specimen to be scanned is best placed so that it can be properly imaged. In this embodiment, the region of interest is at the centre of the inner chamber 20. It will be understood that the size and configuration of the region of interest depends on relative positioning and capabilities of the various components of which the device 10 is comprised. For example, the height of the region of interest is defined by the height of the field of view of the imaging devices of the imaging system and their positioning with respect to the height of the inner chamber 20, and the breadth of the region of interest is defined by the distance from the imaging devices to the centre of the inner chamber 20 and the breadth of the fields of view of the imaging devices themselves.

Inner chamber 20 also includes a floor 22 that incorporates a specimen support region 24 at the bottom of the region of interest, and an overhang 26 forming the periphery of a generally circular open top 28 opposite the specimen support region 24. Rock specimens may be inserted into, and removed from, the inner chamber 20 via open top 28. As will be described below, in this embodiment specimen support region 24 physically receives a specimen support structure 50 (not shown in FIG. 1 or 2), which itself can be used to receive and support an elongate core sample during imaging.

Specimen support region 24, in this embodiment, is itself a generally cylindrical channel that extends downwards from the floor 22 of the inner chamber 20 and through the bottom 30 of device 10. A narrow annular shelf 25 lines the interior of the specimen support region 24 to prevent a specimen support structure 50 from exiting through the bottom 30 of device 10, while still enabling a core sample to linearly project through the bottom 30 of device 10 as desired. More particularly, a core sample may be received within a specimen support structure 50, which is itself received within the specimen support region 24. The core sample may be substantially co-axially aligned with the specimen support region 24, or at least have a size enabling it to be passed through the specimen support region through bottom 30. The core sample may be arranged to linearly project through the bottom 30 thereby to enable different lengthwise portions of the core sample to be imaged in a given imaging session, as will be described.

In this embodiment, an upper ambient lighting unit 32U is supported within overhang 26. Ambient lighting unit 32U comprises a ring of light emitting diodes (LEDs) 34 with a diffuser structure 36 running underneath overhang 26. Ambient lighting unit 32U is oriented such that the LEDs 34 can direct additional ambient lighting downwards into the inner chamber 20 towards the region of interest. Similarly, a lower ambient lighting unit 32L is supported within the floor 22 of the inner chamber 20. Ambient lighting unit 32L also comprises a ring of LEDs 38 with a diffuser structure 40. Ambient lighting unit 32L is oriented such that the LEDs 38 can direct additional ambient lighting upwards into the inner chamber 20 towards the region of interest. The upper and lower ambient lighting units 32U and 32L serve to increase the amount of ambient light within the region of interest in order to brightly illuminate a rock specimen during imaging, at particular times or generally.

A first series of ports 24 extends from the annular region 18 of device 10 through inner wall 16 to the inner chamber 20. Each of ports 24 is at a respective fixed location with respect to the region of interest and thereby faces the region of interest from a respective vantage point. The first series of ports 24 is arranged as a ring surrounding the region of interest. Each port 24 is dimensioned to support a respective digital imaging device so that the digital imaging device has a field of view encompassing the region of interest. In this embodiment, there are eight (8) ports 24 for supporting and orienting eight (8) digital imaging devices of the imaging system, around the region of interest as will be described. The digital imaging devices are positioned within ports 24 to have a lens-to-center distance of 25 centimeters.

A second series of ports 26 extends from the annular region 18 of device 10 through inner wall 16 to the inner chamber 20. Each of ports 26 is at a respective fixed location with respect to the region of interest and thereby faces the region of interest from a respective vantage point. The second series of ports 26 is arranged as a ring surrounding the region of interest. Each port 26 is dimensioned to support a respective illumination device so that the illumination device can direct an illumination pattern into the region of interest. In this embodiment, there are eight (8) ports 26 for supporting and orienting eight (8) illumination devices of an illumination system, around the region of interest. However, in this embodiment only four (4) of the ports 26 are occupied by illumination devices. The illumination devices are configured to direct their illumination patterns into the region of interest so that the illumination patterns intersect, as will be described.

Figure 3A:
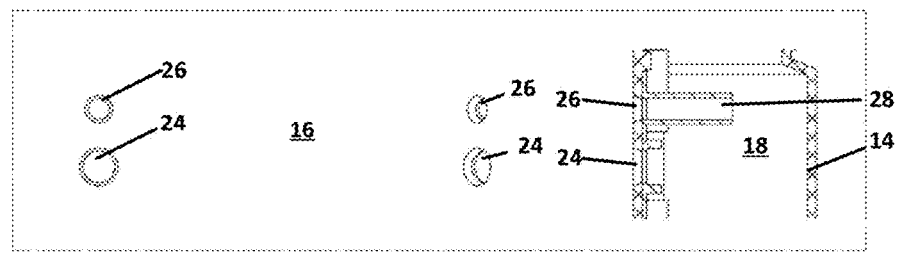
FIG. 3A is an enlarged sectional view of a portion of the device of FIG. 2, taken from the line A-A in FIG. 1 showing imaging device and illumination device ports through the inner wall of the chamber and an illumination deflector structure for limiting the spread of the illumination emitted by the illumination devices.

FIG. 3A is an enlarged sectional view of a portion of the device of FIG. 2, taken from the line A-A in FIG. 1. As distinct from ports 24, each of ports 26 is combined with an illumination deflector structure 28 for supporting a respective illumination device and also narrowing the width of the illumination patterns directed into the region of interest by the illumination devices. The widths of the illumination patterns are preferably narrowed. This is so that their illumination patterns are substantially restricted to be projected mainly onto a rock specimen and not onto imaging devices at ports 24 that are across the region of interest from the illumination device but not occluded by a rock specimen being imaged. In this embodiment, each illumination deflector structure 28 is a tubular structure supporting an illumination device such that the end of each illumination device emitting the illumination is receded a small amount from the inner wall 16 rather than flush with the inner wall 16. The illumination throw of the illumination device therefore is incident on a portion of the interior of the tubular structure, causing the illumination pattern to be deflected a small amount such that the illumination pattern leaving the respective port 26 has a slightly narrower overall beam than the illumination pattern leaving the illumination device itself.

Figure 3B:
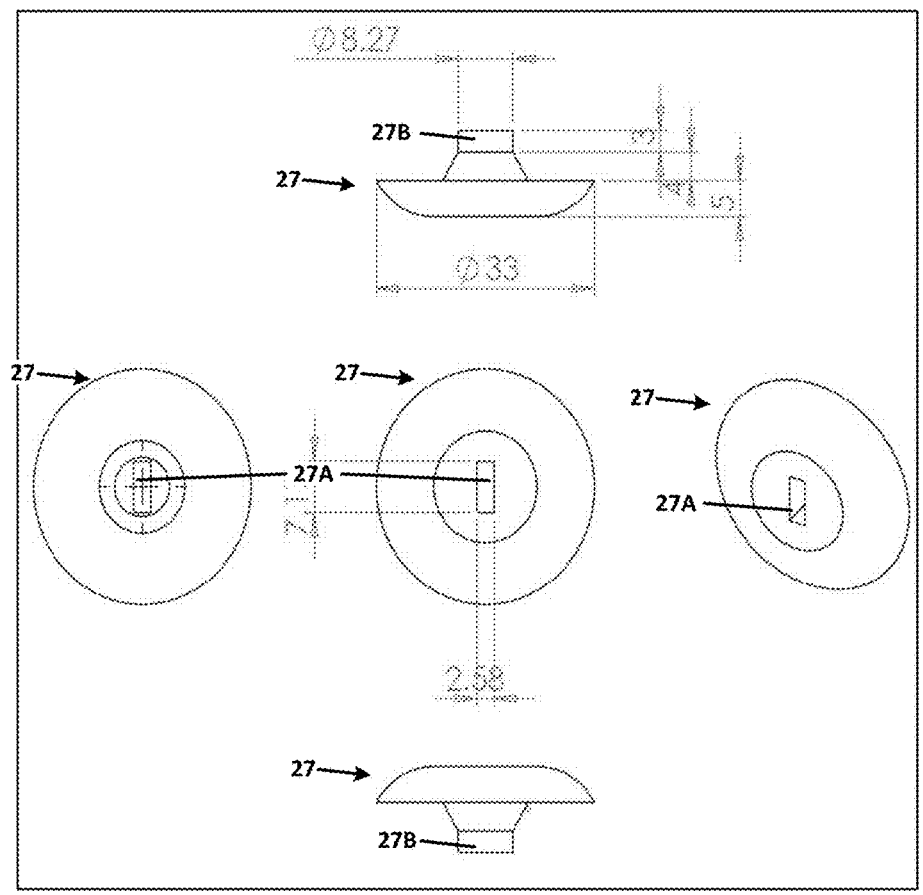
FIG. 3B shows two sides, a front, a back and a front perspective view of an illumination guide for coupling with illumination device ports as an alternative to the illumination deflector structure for limiting the spread of the illumination emitted by the illumination devices.

FIG. 3B shows two sides, a front, a back and a front perspective view of an illumination guide 27 for coupling with a corresponding one of the illumination device ports 26 as an alternative or compliment to the illumination deflector structure 28. Like illumination deflector structure 28, illumination guide 27 limits the spread of the illumination emitted by the illumination devices from ports 26 into the region of interest, by channeling the light through channel 27A. An illumination guide 27 may be coupled with each respective port 26 by inserting a corresponding plug 27B of the illumination guide 27 into port 26 in friction fit or by adhesive. In alternative embodiments, illumination guide 27 or portions thereof may be integrated with frame 12.

FIG. 4A is a perspective view of a specimen support structure 50 for positioning at the bottom of the region of interest within the specimen support region 24 of device 10, according to an embodiment. FIG. 4B is a front elevation view of the specimen support structure 50, FIG. 4C is a front sectional view of the specimen support structure 50, taken from the line A-A in FIG. 4B, FIG. 4D is a top view of the specimen support structure 50, and FIG. 4E is a bottom view of the specimen support structure 50.

Specimen support structure 50 is dimensioned to be supported on annular shelf 25 within specimen support region 24. Specimen support structure 50 is dimensioned and configured to grip and hold a core sample in an upright position within the inner chamber 20. In this embodiment, specimen support structure 50 is dimensioned to receive and support, as well as lock, either cylindrical and non-cylindrical elongate core samples in an upright orientation within the region of interest. Non-cylindrical elongate core samples includes but is not limited to quarter-cylinder, half-cylinder, three-quarter cylinder, and imperfect substantially-cylindrical core samples such as those with various missing chips or fragments, and such substantially quarter-cylinder, substantially half-cylinder, substantially three-quarter cylinder with various missing chips or fragments. Specimen support structure 50 is constructed to receive, support and lock a vast range of elongate core samples in an upright orientation for imaging.

Specimen support structure 50 includes a locker housing 52 formed of multiple flexibly-interconnected side members 54. A rubber O-ring 56 surrounds the side members 54 and is held in place within respective channels 57 formed towards a top end of each of the side members 54. Each side member 54 is wedge-shaped in cross section, and together the side members form a core lock region 58 into which a core may be inserted and held in place by being squeezed inwardly by the side members 54 under pressure from the rubber O-ring 56.

The specimen support structure 50 is dimensioned to support and grip either a full-cylinder, a half-cylinder, a three-quarter-cylinder, a quarter-cylinder, or some other elongate core sample in an upright position. When pushed into the specimen support region 24 along with a received core sample, specimen support structure 50 is further pushed inward to more tightly grip the received core sample due to the physical interaction between the O-ring 56 and the inner wall of the specimen support region 24. This configuration serves as a locking mechanism for selectively locking and unlocking the core sample within the specimen support structure 50. The specimen support structure 50 may easily be removed from the specimen support region 24 to loosen the grip on the core sample so that it may be pushed further through the specimen support structure 50, removed and turned end-to-end, or replaced by another core sample to be imaged.

Figure 5:
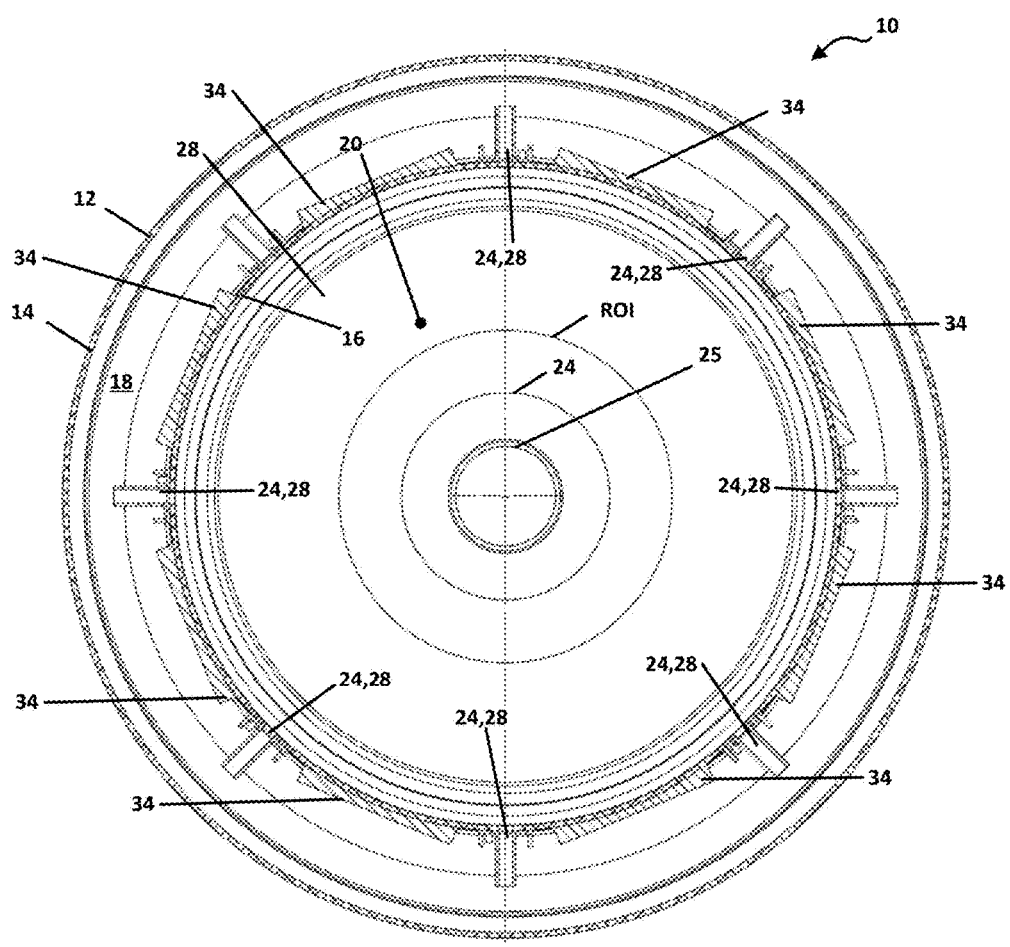
FIG. 5 is an enlarged sectional view of the device of FIG. 1, taken from the line H-H in FIG. 1.

FIG. 5 is an enlarged sectional view of frame 12 of device 10, taken from the line H-H in FIG. 1. The view of FIG. 5 looks downwards onto device 10 from the top, and there is shown the exterior wall 14, inner wall 16, annular region 18, inner chamber 20, floor 22, overhang 26, open top 28, specimen support region 24 with shelf 25, the region of interest ROI, eight (8) ports 26 (each of the eight (8) ports 24 are below respective ones of the eight (8) ports 26 in FIG. 5). Also shown is the illumination deflector structure 28 for each of the eight (8) ports 26 extending from the inner chamber 20 into the annular region 18.

As also shown in FIG. 5, extending from inner wall 16 a small degree into annular region 18, are component support walls 34. Component support walls 34 are each dimensioned to provide a flat surface area for supporting electrical or electronic components such as microprocessor boards for controlling respective digital imaging devices, a main controller as will be described, wiring and other supporting components, all within the annular region 18. Such components may be supported on respective component support walls 34 using screws, with some adhesive, or otherwise as appropriate. For example, a microprocessor board may itself have holes suitable for passing a screw or bolt therethrough and into a respective component support wall 34, whereas eyelets or other components may be used for wires and the like.

Figure 6:
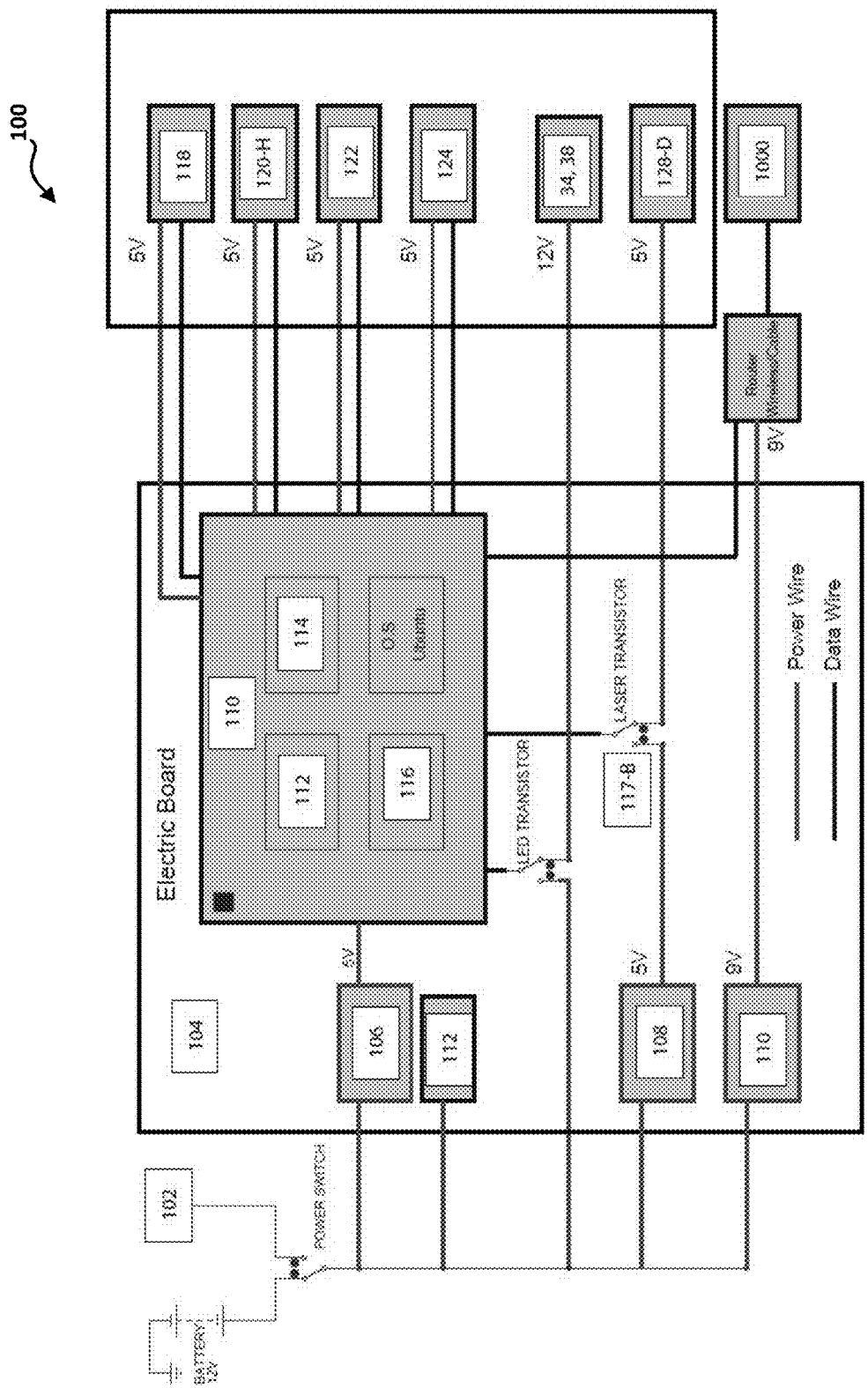
FIG. 6 is a schematic block diagram of a system including the device of FIG. 1 in further detail, and a controller, according to an embodiment.

FIG. 6 is a schematic block diagram of a system including the electrical components 100 of device 10, and a computer station 1000, according to an embodiment. Electrical components 100 are, for the most part, supported within frame 12 of device 10, such as within ports 24 or 26, or on component support walls 34.

In this embodiment, power to device 10 can be furnished by a power supply 102 that is a standard electrical outlet providing 110 or 210 Volts AC, but which is subsequently transformed to 12 Volts and 5 Volts DC and conditioned for provision to the electrical and electronic components using well-known power conditioning circuitry. The power supply 102 may be, for example, a standard vehicle battery whose voltage is provided directly to some components (perhaps through power-conditioning circuitry) and further reduced to 5 VDC (and power-conditioned) as required for other components. Providing device 10 with the capability of being powered by a small portable battery such as a vehicle battery greatly enhances the applicability of device 10 in hard-to-reach geographic locations that do not have reliable supplies of mains power or where generators are more expensive to operate and/or are being used for other parts of a drilling operation. It will be understood that, in this embodiment, the vehicle battery would remain physically external to device 10 and would be electrically-connected to the electrical components of device 10 using a cable or cables.

A main board 104, supported on one of the component support walls 34 within the annular region 18 of the device 10, itself supports a number of power converters 106, 108, 110 receiving power from the power supply 102 and outputting power to respective other components. The power supply 102 also supplies power to a fan 112 that is positioned within the annular region 18 for maintaining airflow between the annular region 18 and the exterior of the device 10 thereby to guard against overheating of components 100 that are within the annular region 18.

In this embodiment, the main board 104 also supports a controller unit 110 that receives 5 VDC from power converter 106 and includes a central processing unit (CPU) 112, random access memory (RAM) 114, and a solid state hard drive (SSD) 116. In this embodiment, the controller unit is based on the Raspberry Pi microcontroller offered by the Raspberry Pi Foundation (https://www.raspberrypi.org). The role of the controller unit 110 is to coordinate the imaging system and the illumination system to capture sets of images of core samples in the region of interest and to store the sets of images in Bitmap, JPEG and/or PNG format in either the SSD 116 or on a memory card, so that the image sets can be retrieved and transmitted for downstream processing to computer station 1000 via Ethernet or Wi-Fi interconnection In this embodiment, CPU 112 is an Intel i7 processor, there is support for up to 4 GB of RAM 114, and the SSD 116 has a 500 GB capacity. The controller unit 110 is configured to operate control software operating using the Ubuntu, Linux-derived operating system and is in communication with various components external to controller unit 110 for operating controller unit 110 and for being operated by controller unit 110. For example, a touch screen 118 accessible from the exterior of device 10 is provided with a graphical user interface (GUI) by controller unit 110 for enabling a user to operate controller unit 110. Also, digital imaging devices 120A-H are each controlled by controller unit 110. Also, a global positioning system (GPS) transceiver 122, a sensor 124 for gauging temperature, humidity and barometric pressure (such as an MDE280 sensor), the upper and lower ambient lighting units 34 and 38, and the four (4) illumination devices 128A-D of the illumination system are in communication with, or are at least controlled—via switches 117A and 117B—by controller unit 110.

In this embodiment, the GPS transceiver 122 is optionally employed to geo-fence the operation of device 10, so that it may only be operational in one or more agreed-upon geographic regions. In the event that the controller unit 110 detects from the GPS transceiver 122 that device 10 is outside of an agreed-upon geographic region(s), or GPS transceiver 122 is not operational, controller unit 110 prevents operation of at least the imaging devices until the GPS transceiver 122 indicates to controller unit 110 that device 10 is back within the agreed-upon geographic region(s). This feature enables an arrangement where device 10 is loaned or rented to a mining operation only for use in a particular place, to prevent the mining operation from using device 10 in a different place, in violation of the arrangement. The feature may be disabled using the software on the controller unit 110 during manufacture or subsequent configuration.

In this embodiment, the touch screen 118 is a 3.5-inch thin film transistor (TFT) liquid crystal display displaying a graphical user interface (GUI) developed using the QT ("cute") cross-platform application framework.

In this embodiment, each of the digital imaging devices 120A-H of the imaging system is a Chameleon 3, 1.3 Megapixel (MP), colour USB (Universal Serial Bus) digital camera, part number CM3-U3-13S2C-CS available from https://www.ptgrey.com/chameleon3-usb3-vision-cameras. Each digital camera is coupled with a micro lens adaptor for CS to M12, part number ACC-01-5005, and Boowon BW80H-1000 lenses offering 8 mm, ⅓", and an M12 mount, part number ACC-01-4002. The digital cameras are arranged within frame 18 with respect to the region of interest to have a lens-to-centre distance of 25 centimeters. As configured, this enables each digital camera to have a field of view that can completely encompass a 25 centimeter-long core sample supported within the region of interest.

In this embodiment, each of the illumination devices 128 is a pattern light-emitting red laser that emits 41 parallel lines, available in the UHL series of lasers from World Star Tech of Markham, Ontario, Canada under part number UHLS-10G635-DER-284. The lasers are arranged in frame 12 to direct the parallel lines at an angle of 63 degrees.

Figure 7:
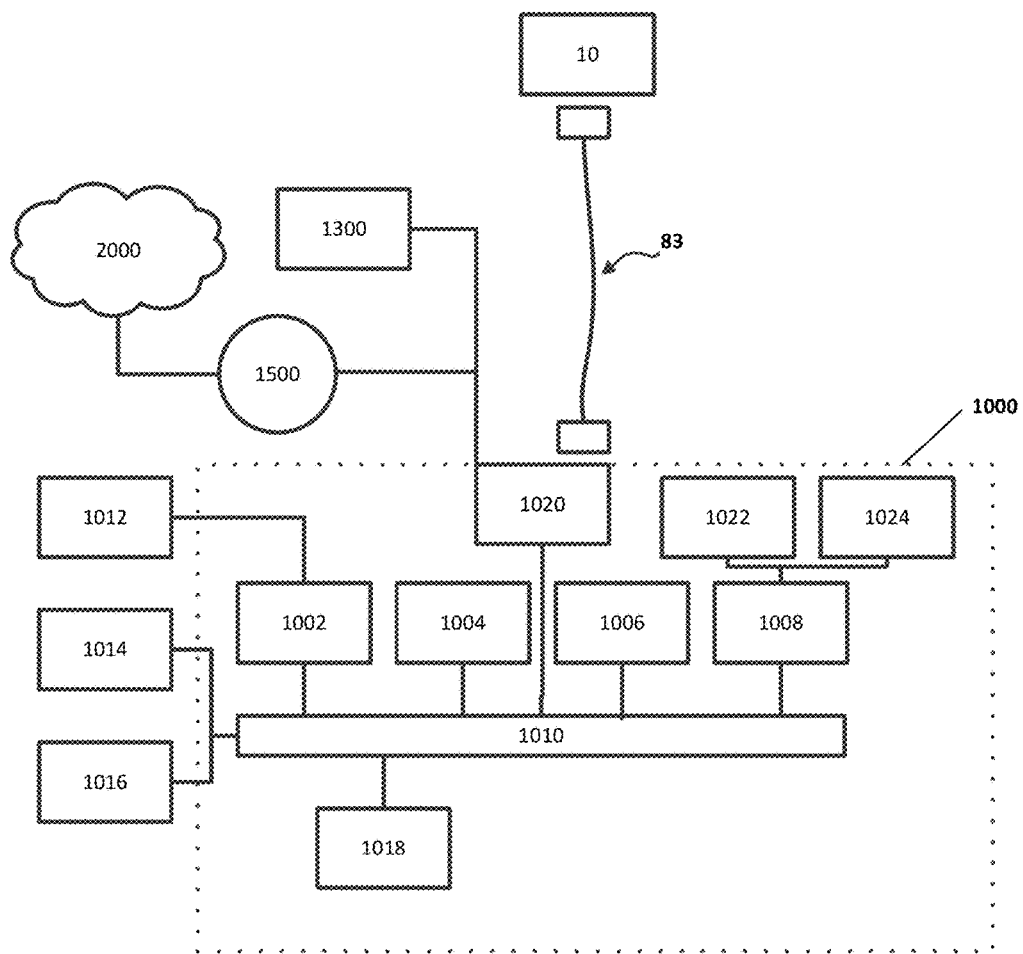
FIG. 7 is a schematic block diagram of a system including the device of FIG. 1 and the controller in further detail, according to an embodiment.

FIG. 7 is a schematic block diagram of the system including device 10 connected to computer station 1000 via connector 83, with the computer station 1000 shown in further detail, according to an embodiment. In this embodiment, computer station 1000 is a computing system that is incorporated into a laptop or desktop computer or other similar device.

Computer station 1000 includes a bus 1010 or other communication mechanism for communicating information, and a processor 1018 coupled with the bus 1010 for processing the information. Computer station 1000 also includes a main memory 1004, such as a random access memory (RAM) or other dynamic storage device (e.g., dynamic RAM (DRAM), static RAM (SRAM), and synchronous DRAM (SDRAM)), coupled to the bus 1010 for storing information and instructions to be executed by processor 1018. In addition, the main memory 1004 may be used for storing temporary variables or other intermediate information during the execution of instructions by the processor 1018. Processor 1018 may include memory structures such as registers for storing such temporary variables or other intermediate information during execution of instructions. The computer station 1000 further includes a read only memory (ROM) 1006 or other static storage device (e.g., programmable ROM (PROM), erasable PROM (EPROM), and electrically erasable PROM (EEPROM)) coupled to the bus 1010 for storing static information and instructions for the processor 1018.

The computer station 1000 also includes a disk controller 1008 coupled to the bus 1010 to control one or more storage devices for storing information and instructions, such as a magnetic hard disk 1022, and a removable media drive 1024 (e.g., floppy disk drive, read-only compact disc drive, read/write compact disc drive, compact disc jukebox, tape drive, and removable magneto-optical drive). The storage devices may be added to the computer station 1000 using an appropriate device interface (e.g., small computing system interface (SCSI), integrated device electronics (IDE), enhanced-IDE (E-IDE), direct memory access (DMA), or ultra-DMA).

The computer station 1000 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer station 1000 may also include a display controller 1002 coupled to the bus 1010 to control a display 1012, such as a liquid crystal display (LCD) screen, for displaying information to a user of the computer station 1000. The computer station 1000 includes input devices, such as a keyboard 1014 and a pointing device 1016, for interacting with a computer user and providing information to the processor 1018. The pointing device 1016, for example, may be a mouse, a trackball, or a pointing stick for communicating direction information and command selections to the processor 1018 and for controlling cursor movement on the display 1012. In addition, a printer may provide printed listings of data stored and/or generated by the computer station 1000.

In this embodiment, device 10 can be operated completely autonomously with respect to the computer station 1000 to capture digital images of a rock specimen and to store the digital images in a structured way for subsequent retrieval and downstream processing by computer station 1000. That is, in this embodiment, device 10 does not need computer station 1000 in order to be fully operational.

However, the computer station 1000 performs certain downstream processing steps of the invention in response to the processor 1018 executing one or more sequences of one or more instructions contained in a memory, such as the main memory 1004. Such instructions may be read into the main memory 1004 from another computer readable medium, such as a hard disk 1022 or a removable media drive 1024. One or more processors in a multi-processing arrangement may also be employed to execute the sequences of instructions contained in main memory 1004. In alternative embodiments, hard-wired circuitry may be used in place of or in combination with software instructions. Thus, embodiments are not limited to any specific combination of hardware circuitry and software.

As stated above, the computer station 1000 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the computer station 1000, for driving a device or devices for implementing aspects of the invention, and for enabling the computer station 1000 to interact with a human user. Such software may include, but is not limited to, device drivers, operating systems, development tools, and applications software. Such computer readable media further includes certain computer program products of the present invention for performing all or a portion (if processing is distributed) of the processing performed in implementing the invention.

The computer code devices of the present invention may be any interpretable or executable code mechanism, including but not limited to scripts, interpretable programs, dynamic link libraries (DLLs), Java classes, and complete executable programs.

For example, OpenCV (Open Source Computer Vision) and PCL (Point Cloud Library) libraries may be used for image analysis and point cloud generation. A visualization toolkit such as VTK (The Visualization Toolkit), along with QT Enterprise may be used to process the virtual core as will be described.

Moreover, parts of the processing of the present invention may be distributed for better performance, reliability, and/or cost.

A computer readable medium providing instructions to a processor 1018 may take many forms, including but not limited to, non-volatile media, volatile media, and transmission media. Non-volatile media includes, for example, optical, magnetic disks, and magneto-optical disks, such as the hard disk 1022 or the removable media drive 1024. Volatile media includes dynamic memory, such as the main memory 1004. Transmission media includes coaxial cables, copper wire and fiber optics, including the wires that make up the bus 1010. Transmission media also may also take the form of acoustic or light waves, such as those generated during radio wave and infrared data communications.

Various forms of computer readable media may be involved in carrying out one or more sequences of one or more instructions to processor 1018 for execution. For example, the instructions may initially be carried on a magnetic disk of a remote computer. The remote computer can load the instructions for implementing all or a portion of the present invention remotely into a dynamic memory and send the instructions over a telephone line using a modem. A modem local to the computer station 1000 may receive the data on the telephone line and use an infrared transmitter to convert the data to an infrared signal. An infrared detector coupled to the bus 1010 can receive the data carried in the infrared signal and place the data on the bus 1010. The bus 1010 carries the data to the main memory 1004, from which the processor 1018 retrieves and executes the instructions. The instructions received by the main memory 1004 may optionally be stored on storage device 1022 or 1024 either before or after execution by processor 1018.

The computer station 1000 also includes a communication interface 1020 coupled to the bus 1010. The communication interface 1020 provides a two-way data communication coupling to a network link that is connected to, for example, a local area network (LAN) 1500, or to another communications network 2000 such as the Internet, or to another device via, for example, a USB or other network connection such as device 10. The communication interface 1020 may include a network interface card to attach to any packet switched LAN. As another example, the communication interface 1020 may include an asymmetrical digital subscriber line (ADSL) card, an integrated services digital network (ISDN) card or a modem to provide a data communication connection to a corresponding type of communications line. Wireless links may also be implemented. In any such implementation, the communication interface 1020 sends and receives electrical, electromagnetic or optical signals that carry digital data streams representing various types of information and, in the case of USB, electrical power.

The network link typically provides data communication through one or more networks to other data devices. For example, the network link may provide a connection to another computer through a local network 1500 (e.g., a LAN) or through equipment operated by a service provider, which provides communication services through a communications network 2000. The local network 1500 and the communications network 2000 use, for example, electrical, electromagnetic, or optical signals that carry digital data streams, and the associated physical layer (e.g., CAT 5 cable, coaxial cable, optical fiber, etc.). The signals through the various networks and the signals on the network link and through the communication interface 1020, which carry the digital data to and from the computer station 1000, may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computing system 1000 can transmit and receive data, including program code, through the network(s) 1500 and 2000, the network link and the communication interface 1020. Moreover, the network link may provide a connection through a LAN 1500 to a mobile device 1300 such as a personal digital assistant (PDA) laptop computer, or cellular telephone.

The device 10 is calibrated/initialized at the factory by determining the intrinsic and extrinsic parameters of various components and ensuring the software is aware of the parameters for downstream processing. For example, some intrinsic parameters include the focal length of the digital cameras, the image sensor format, the principal point and the lens distortion coefficients. Some extrinsic parameters include the x, y and z coordinates of the camera lens and lasers with respect to the region of interest and to each other.

During use of device 10, a rock specimen such as a core sample can be placed by a person through the open top 28 of the chamber and supported in an upright orientation by the specimen support structure 50 in the specimen support region 24 at the bottom of the region of interest as has been described. Using the touch screen 118, the user interacts with the controller unit 110 to coordinate the rapid capture of multiple images of the rock specimen from the respective vantages of the digital cameras 120 around the region of interest, both when the illumination system are in a first illumination state and when the illumination devices are in a second illumination state. In this embodiment, the first illumination state represents the state of the lasers 128 being activated to direct intersecting illumination patterns into the region of interest to project onto the rock specimen. The second illumination state represents the state of the lasers 128 being de-activated such that they do not emit any radiation, but the upper and lower ambient lighting units 32U and 32L being activated thereby to brighten the core sample for the second set of images. Each set of images can be captured and stored by the controller unit in approximately 3 seconds.

Figure 8:
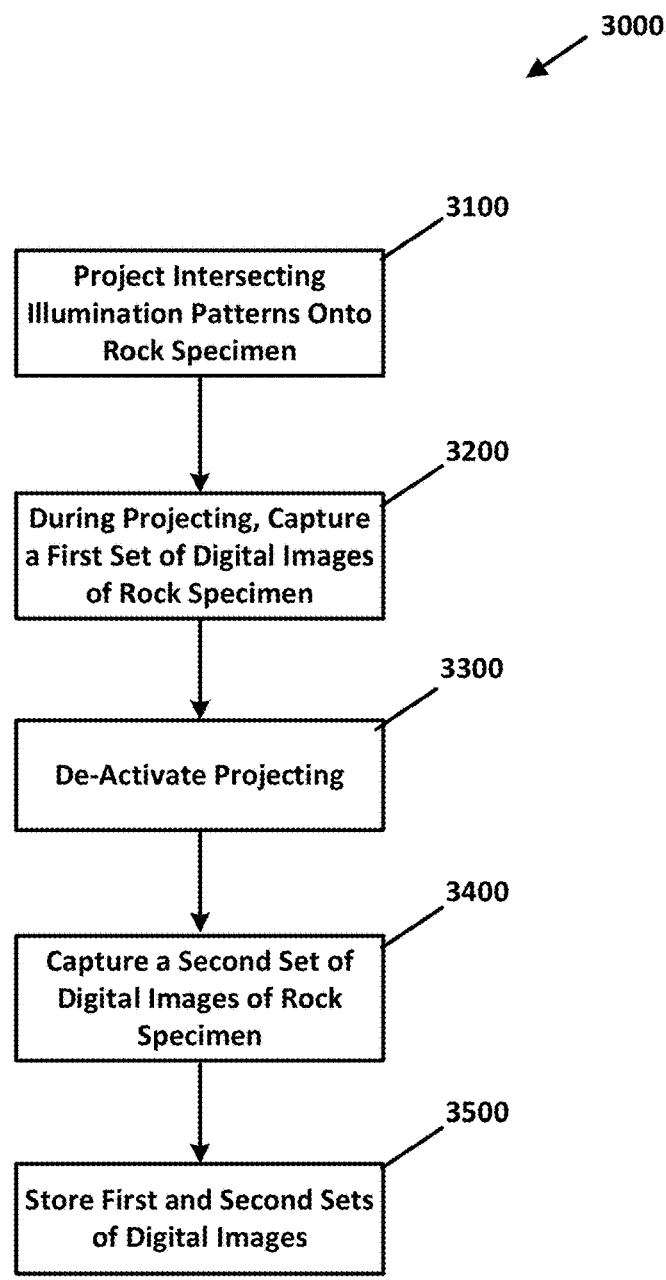
FIG. 8 is a flowchart depicting steps in a method of capturing data from a rock specimen, according to an embodiment.

FIG. 8 is a flowchart depicting steps in a method 3000 of capturing data from a rock specimen that is supported in a region of interest, for example an elongate core sample supported in an upright orientation, according to an embodiment. During method 3000, intersecting illumination patterns are projected onto the rock specimen from a plurality of directions (step 3100). During the projecting, a first set of digital images of the rock specimen is captured from a plurality of perspectives (step 3200). After the first set of digital images is captured, the projecting is de-activated (step 3300) and a second set of digital images of the rock specimen is captured from the plurality of perspectives (step 3400). The first and second sets of digital images are stored (step 3500).

For ease of understanding, in this description the term digital image may be used interchangeably to refer to the digital image captured from the image capture device, as well as a data structure representation that may be stored and that contains numbers representing pixels of the captured digital image.

Figure 9:
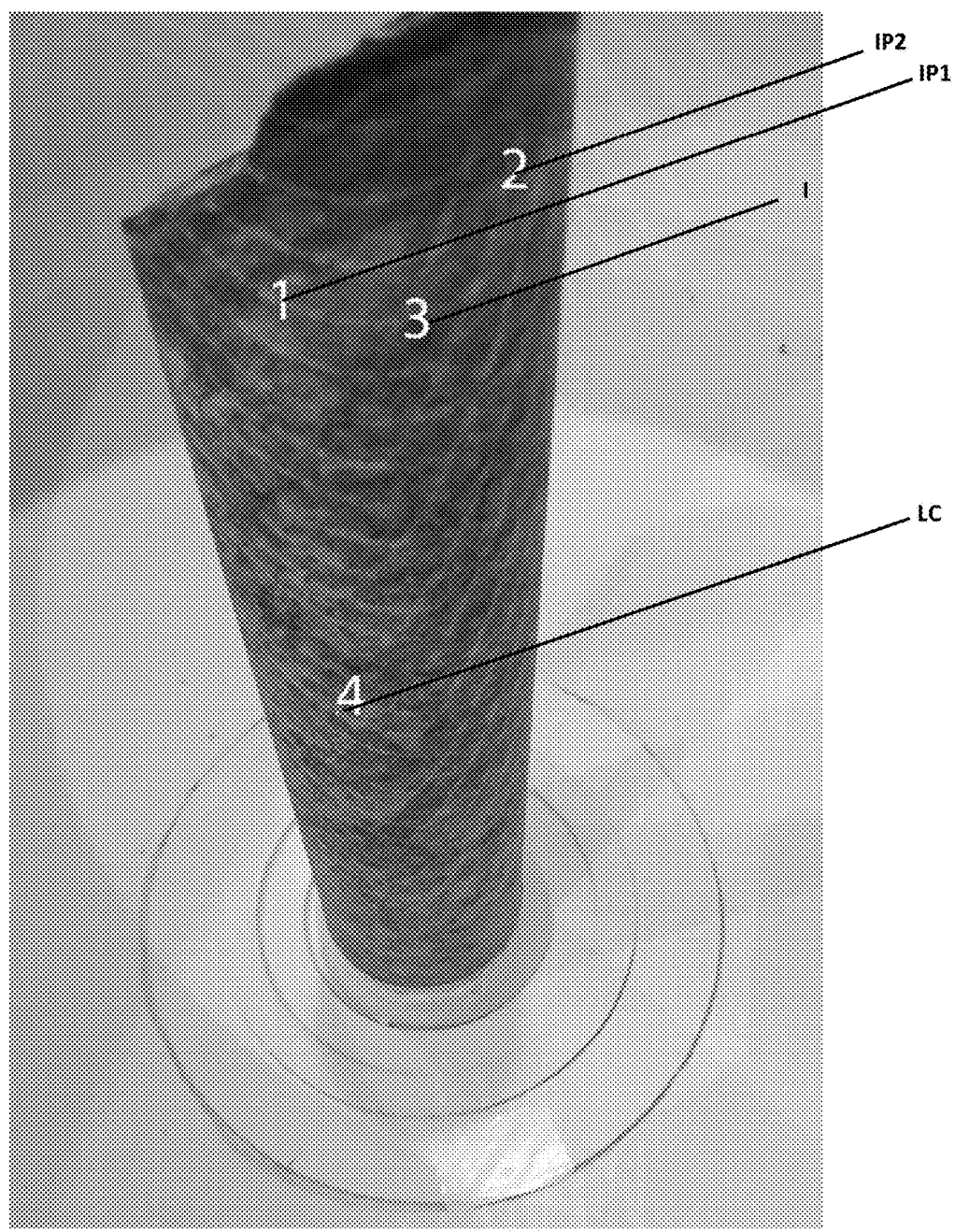
FIG. 9 is an image of an elongate core sample supported by a specimen support structure within the region of interest of the device of FIG. 1, the core sample having intersecting illumination patterns projected onto it.

FIG. 9 is a digital image captured of an elongate core sample supported within the region of interest of the device 10 during the first illumination state, such that the elongate core sample has intersecting illumination patterns projected onto it. The illumination patterns IP1 and IP2 directed into the region of interest by respective lasers 128 are oriented to intersect in multiple locations, such as location I. The brightest red point LC on the image represents the projected center of the leftmost laser 128. The illumination patterns, being repeated parallel line patterns, their intersections I, and the projected centre LC of the lasers 128 are captured within the digital images and processed downstream to produce a point cloud and the final geometry of the core sample for producing the virtual core sample. As will be described, the pattern created by the intersection illumination patterns can also be used for image segmentation and indexing.

In this embodiment, after the first set of digital images is captured and before the second set of digital images is captured, the first set of digital images is stored on the SSD 116. The first set of digital images is stored as individual digital image files within a folder on the SSD 116 that is automatically accorded a folder name formed from the current date and time tracked by the controller unit 110. For example, the folder name for the sets of digital images whose capture began on Feb. 25, 2017 at time 17:12:30 would be "20170225_171230". After the second set of digital images is captured, they are also stored within the folder on the SSD 116. The image files stored within the folder for a given imaging session are each accorded file names formed from the given ID of the digital camera that captured the digital image and the illumination state of the illumination system at the time. For example, the PNG-formatted file for a digital image captured during the first illumination state (with the lasers activated) by digital camera 001 would be named "001ls.png" whereas the PNG-formatted file for a digital image captured during the second illumination state (with the lasers de-activated, i.e., just white light) by digital camera 001 would be named "001wl.png.". The file structure would appear as shown in Table 1 below.

TABLE 1

| TOP | FOLDER CONTENTS |
|---|---|
| 20170225_171230 (FOLDER) | 001ls.png |
| | 002ls.png |
| | 003ls.png |

TABLE 1-continued

| TOP | FOLDER CONTENTS |
|---|---|
| | 004ls.png |
| | 005ls.png |
| | 006ls.png |
| | 007ls.png |
| | 008ls.png |
| | 001wl.png |
| | 002wl.png |
| | 003wl.png |
| | 004wl.png |
| | 005wl.png |
| | 006wl.png |
| | 007wl.png |
| | 008wl.png |
| 20170225_171235 (FOLDER) | 001ls.png |
| | 002ls.png |
| | 003ls.png |
| | 004ls.png |
| | 005ls.png |
| | 006ls.png |
| | 007ls.png |
| | 008ls.png |
| | 001wl.png |
| | 002wl.png |
| | 003wl.png |
| | 004wl.png |
| | 005wl.png |
| | 006wl.png |
| | 007wl.png |
| | 008wl.png |

In this embodiment, device 10 having eight (8) digital cameras in its imaging system would produce sixteen (16) image files for each folder, where only one portion of the core sample was required to be scanned. These image files would be named: 001ls.png . . . 008ls.png and 001wl.png . . . 008wl.png.

However, in the event that it is determined that an important portion of the core sample was being held within the specimen support structure 50 and thus could not be imaged on the first pass, additional images for the specimen can be captured. In such a case, via the touch screen 118 the user ensures the controller unit 110 is aware that two additional sets of images are being captured for the core sample, and the user re-orients the core sample up-side down within the specimen support structure 50 thereby to ensure the previously-blocked portion of the core sample is within the region of interest. The user then activates device 10 to captured two more sets of images in the manner described above—one during the first illumination state and one during the second illumination state. Because the controller unit 110 has been made aware that the two additional sets of images are of the same core sample, the controller unit 110 automatically creates a sub-folder within the original folder (in this case, within the folder named "20170225_121230") named "upsidedown". In the "upsidedown" folder, the controller unit 110 stores the eight (8) additional images taken during the first illumination state on the second pass, and the eight (8) additional images taken during the second illumination state on the second pass, as shown in the "20170225_171230" folder in Table 2, below.

TABLE 2

| TOP | FOLDER CONTENTS | FOLDER CONTENTS |
|---|---|---|
| 20170225_171230 (FOLDER) | 001ls.png | |
| | 002ls.png | |
| | 003ls.png | |

TABLE 2-continued

| TOP | FOLDER CONTENTS | FOLDER CONTENTS |
|---|---|---|
| | 004ls.png | |
| | 005ls.png | |
| | 006ls.png | |
| | 007ls.png | |
| | 008ls.png | |
| | 001wl.png | |
| | 002wl.png | |
| | 003wl.png | |
| | 004wl.png | |
| | 005wl.png | |
| | 006wl.png | |
| | 007wl.png | |
| | 008wl.png | |
| | upsidedown (FOLDER) | 001ls.png |
| | | 002ls.png |
| | | 003ls.png |
| | | 004ls.png |
| | | 005ls.png |
| | | 006ls.png |
| | | 007ls.png |
| | | 008ls.png |
| | | 001wl.png |
| | | 002wl.png |
| | | 003wl.png |
| | | 004wl.png |
| | | 005wl.png |
| | | 006wl.png |
| | | 007wl.png |
| | | 008wl.png |
| 20170225_171235 (FOLDER) | 001ls.png | |
| | 002ls.png | |
| | 003ls.png | |
| | 004ls.png | |
| | 005ls.png | |
| | 006ls.png | |
| | 007ls.png | |
| | 008ls.png | |
| | 001wl.png | |
| | 002wl.png | |
| | 003wl.png | |
| | 004wl.png | |
| | 005wl.png | |
| | 006wl.png | |
| | 007wl.png | |
| | 008wl.png | |

Where a particular top folder has a subfolder named "upsidedown", the downstream processing will accept the additional digital images, re-orient them so that all 32 images have the same orientation, and combine them as will be described for generating a three-dimensional model of the core sample.

Advantageously, because the digital cameras 120 are arranged around the region of interest, device 10 does not have to physically move a rock specimen with respect to any one digital camera 120 to capture the image data. As such, device 10 does not need motors, rollers and the like for manipulating the rock specimen to capture quality images from several vantages, and thus does not have the higher weight associated with such components nor the higher power requirements typically required to operate such components. As such, device 10 may be powered very efficiently and in embodiments, as has been described, by a 12-volt power source such as a vehicle battery. Furthermore, device 10 is able to reliably image various configurations of rock specimens, such as half-cylinder, quarter-cylinder and three-quarter-cylinder core samples.

With digital images of a core sample, or many core samples, having been captured and stored within device 10 as described above, the captured digital images may be processed in sets to produce a three-dimensional model, or virtual core, for each of the core samples imaged.

Figure 10:
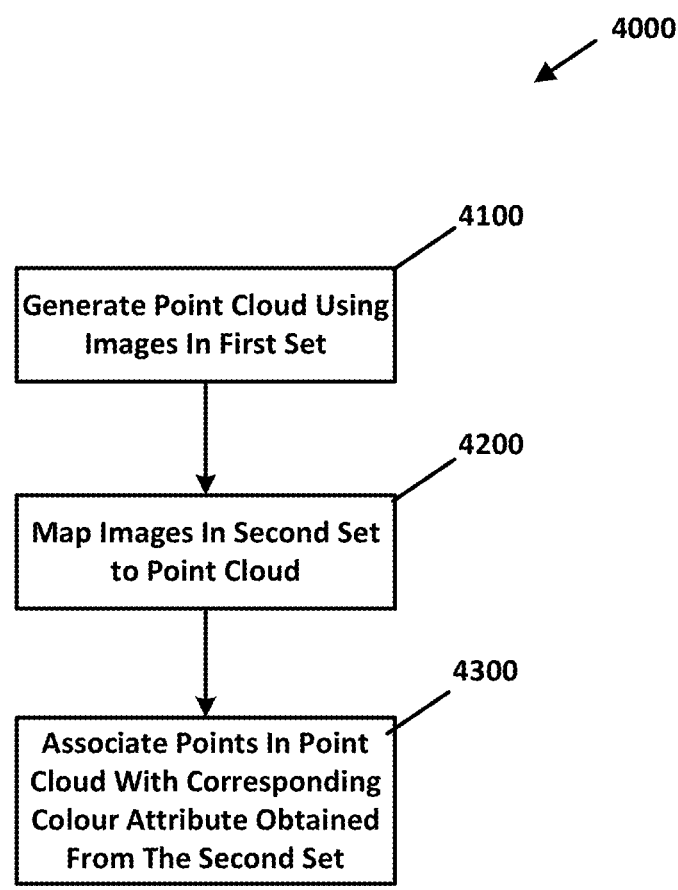
FIG. 10 is a flowchart depicting steps in a method of processing data captured from a rock specimen to produce a three-dimensional model thereof.

FIG. 10 is a flowchart depicting steps in a method 4000 for processing at least the first and second sets of image data captured from a rock specimen, in order to produce a three-dimensional model thereof. During the method, a point cloud corresponding to the core sample is generated (step 4100) using the first set and the images in the second set are mapped to a geometric structure defined by the point cloud thereby to form the three-dimensional model of the rock specimen (step 4200). In this embodiment, the geometric structure is a wireframe constructed using the point cloud that has been generated, and the images in the second set are stitched and best-fit over the wireframe.

Figure 11:
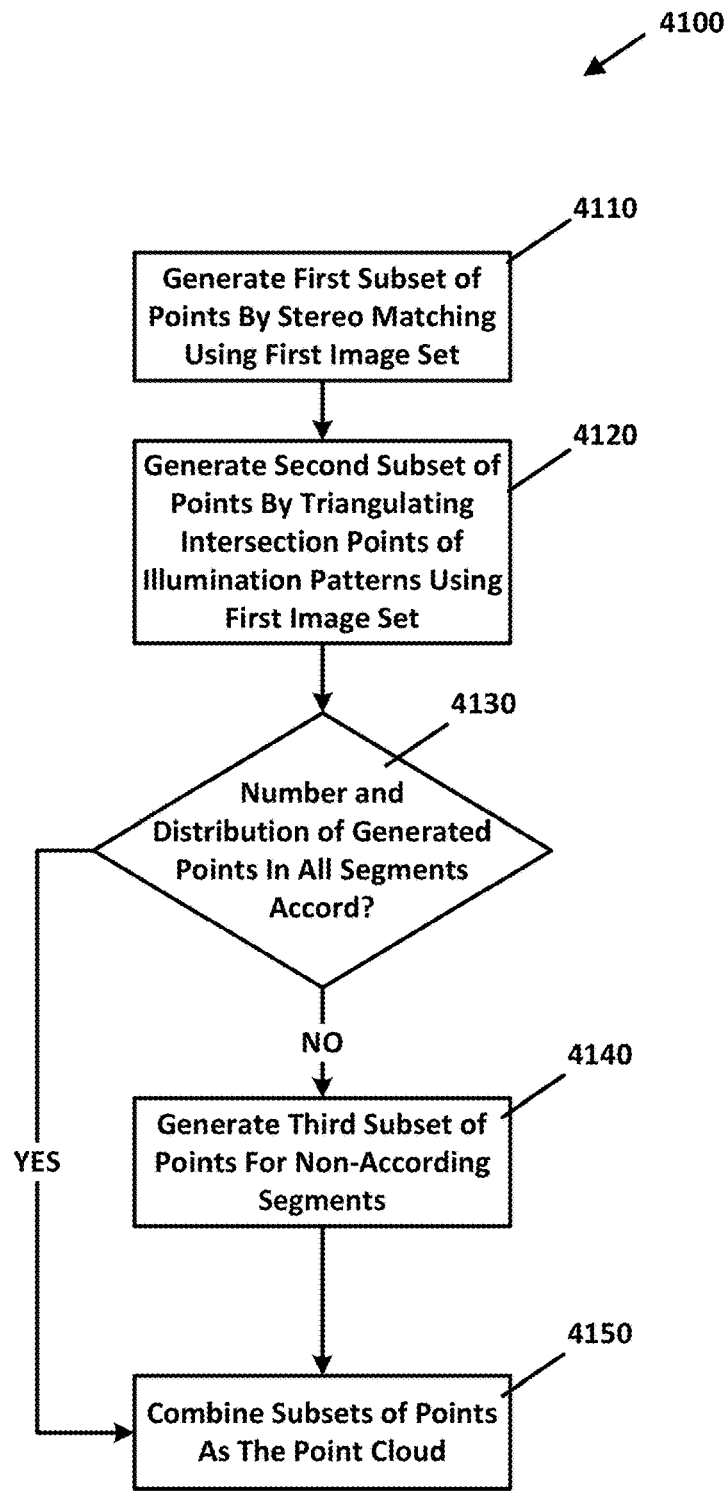
FIG. 11 is a flowchart depicting steps in a method of generating a point cloud.

FIG. 11 is a flowchart depicting steps of step 4100—the point cloud generating—in further detail. During generating the point cloud, a first subset of points is generated by stereo matching using corresponding features within respective pairs of images in the first set (step 4110). The features are both projected features (from the intersecting illumination patterns) and intrinsic features (from the core sample itself).

Then a second subset of points is generated by triangulating intersection points of intersecting illumination patterns in the images in the first set (step 4120).

In the event that the number and distribution of generated points within one or more segments defined by intersecting illumination patterns does not accord with number and distribution of generated points within one or more adjacent segments (step 4130), then a third subset of points within the one or more segments using the first set of images is generated (step 4140).

The number and distribution of generated points in a particular segment may not accord due to surface defects in the core or from miscalculated point coordinates. For example, a distribution and number of points in most segments may have certain levels, whereas a subset of segments delineate a far fewer number or far different (less uniform, for example) distribution of points that most other segments. Image enhancement processing, such as edge detection, brightness adjustment, contrast adjustment and/or histogram (equalization and/or normalization) is conducted on the particular segment of interest (rather than necessarily on all segments corresponding to the core sample), in order to put the image of the segment into a condition for better identifying points so as to attempt to obtain a number and distribution of points for the segment that better accords with most other segments. The process of identifying points as described above is then conducted on the image-enhanced segment.

The subsets of points are then combined as the point cloud (step 4150).

Figure 12:
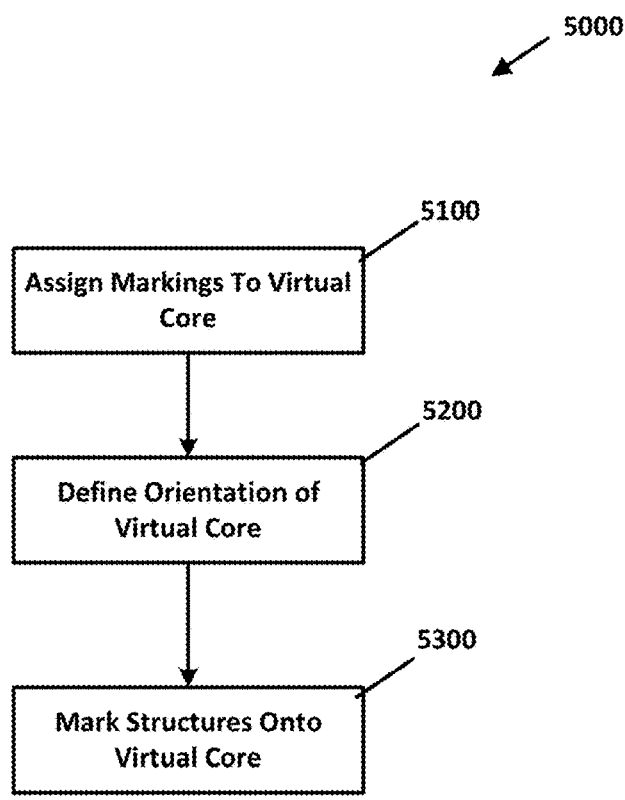
FIG. 12 is a flowchart depicting steps in a method of manipulating a three-dimensional model of a rock specimen.

FIG. 12 is a flowchart depicting steps in a method 5000 of manipulating a three-dimensional model of a rock specimen. With the three-dimensional model of a core sample—the virtual core—having been created as described above, it may be stored along with other virtual cores in a virtual core library and retrieved for manipulation and analysis from any network-connected location, such as at computer station 1000 or a remote device accessible to a geologist, an auditor, an investor etc. During the method, depth and top of the core markings are assigned to the virtual core (step 5100), the orientation of the virtual core in real world coordinates is defined (step 5200), and then structures are marked onto the virtual core (step 5300).

During assignment of depth and top of the core markings (step 5100), the virtual core is loaded upright into the display device in a particular orientation in which the axis of the virtual core is placed along the Z axis of a right-hand rule coordinate system. The top of the core (TOC) is a line hand-drawn on the physical core sample that can be recognized using computer vision or by the user and marked by the user. The right-hand rule coordinate system involves the Northing (Y) axis increasing into the screen away from the observer, the Easting (X) axis increasing along the screen to the right, and the Elevation (Z) axis increasing along the screen upwards. The user then uses a mouse or other user interface component to assign the depth and top of a core reference mark with respect to the virtual core, in order to indicate the position of the core in the world coordinate system. This involves loading information about the borehole trace itself—such as borehole survey information—and using the information to de-survey the virtual core into the world coordinate system and orientation (step 5200).

During marking of structures (step 5300), the user visually studies the virtual core including its intrinsic attributes, as one would do with a physical core sample, and uses user interface tools to mark planes, lines, fold asymmetry, vergence and facing along with fault kinematics to indicate in which direction a fault had moved. The planes and lines are then automatically extended so as to project into a three-dimensional stereonet for visual inspection. At this point, should the user wish to rotate or roll the virtual core using a mouse or other user interface tool, the extended planes and lines, having been extended from the virtual core in the user interface, will rotate and/or roll along with the virtual core thereby to improve the user's understanding of such features with respect to the virtual core.

Figure 13:
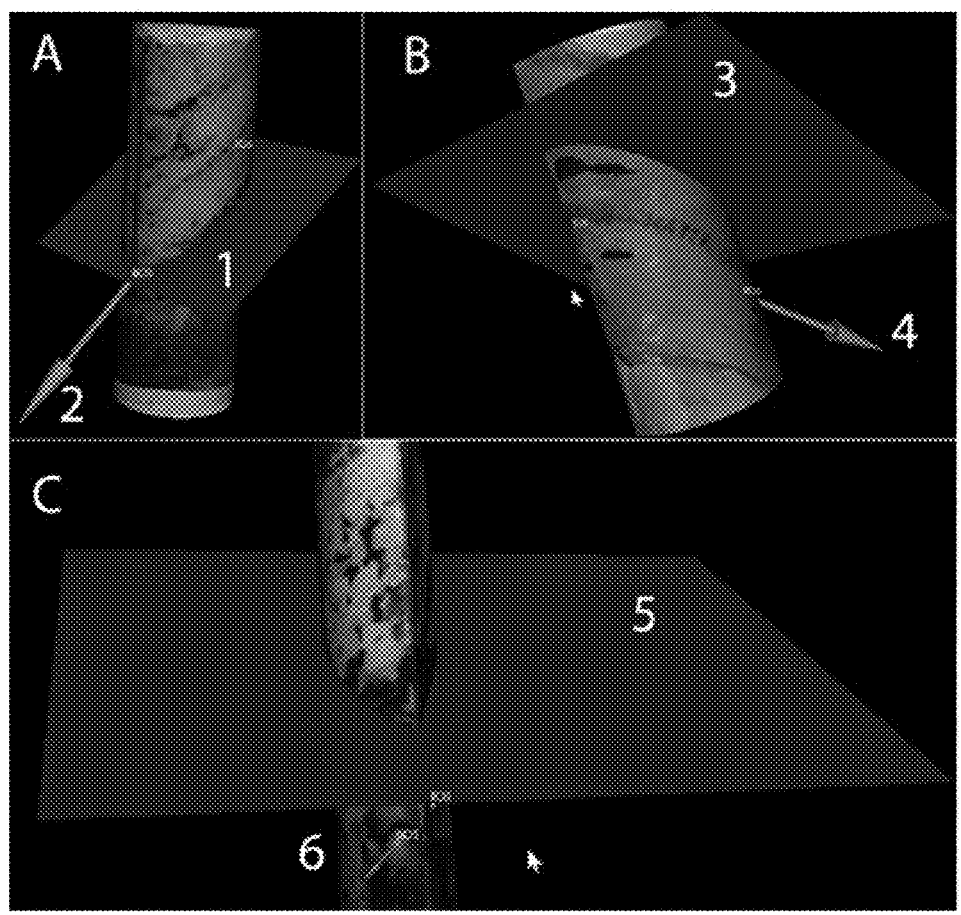
FIG. 13 is screenshots A, B and C of a display device displaying a three-dimensional model of a rock specimen being manipulated.

FIG. 13 is screenshots A, B and C of a display device of, for example, computer station 1000 displaying different three-dimensional models of respective rock specimens being manipulated. The arrows (2, 4, 6) that are shown are representative of vectors specified by a user by identifying particular points on the virtual core and triggering the processing software to connect the particular points in three-dimensional virtual space with a straight line that extends beyond the periphery of the virtual core and will rotate and roll along with any rotation and roll of the virtual core by the user. The planes (1, 3, 5) that are shown are representative of planes specified by a user by identifying particular points on the virtual core and triggering the processing software to connect the particular points in three-dimensional virtual space with a flat plane that extends beyond the periphery of the virtual core and will rotate and roll along with any rotation and roll of the virtual core by the user.

In this embodiment, computer station 1000 also incorporates code for enabling a user to import borehole image or sets of images (optical or acoustic) captured using a borehole imaging device at the drilling site. The computer station 1000 uses similar processes as those explained above with the borehole image or sets of images to form a three-dimensional model of the borehole, and to enable a user to display and manipulate the three-dimensional model of the borehole by creating vectors and planes and the like for the three-dimensional model of the borehole.

Although embodiments have been described with reference to the drawings, those of skill in the art will appreciate that variations and modifications may be made without departing from the spirit, scope and purpose of the invention as defined by the appended claims.

For example, while a certain number of digital imaging devices are used in embodiments described above, other numbers of digital imaging devices (somewhat fewer, somewhat more) may be used, provided that their use enables downstream processing to produce quality three-dimensional models of the rock specimens. For example, additional digital cameras may be used to capture digital images of a rock sample from above or from below. Alternatively, fewer digital cameras, arranged around the region of interest, may be employed. For example, with the configurations described above, it is estimated that as few as four (4) digital cameras may be employed to satisfactory effect. Furthermore, other kinds of digital cameras, having increased resolution may be employed.

Similarly, other numbers of illumination devices (somewhat fewer, somewhat more), or other kinds of intersecting illumination patterns than the intersecting parallel lines may be used, provided that their use enables downstream processing to produce quality three-dimensional models of the rock specimens. Furthermore, other colours of illumination by lasers besides red, such as blue or green, may be used as alternatives.

Alternative configurations of computer station 1000, such as those that are not interacted with directly by a human user through a graphical or text user interface, may be employed. For example, alternatively a computing system having similar components as computer station 1000 could be integrated more tightly with the components of device 10.

Particular voltage/current levels referred to herein may be modified in any manner to provide a functional device 10, as would be understood by a person having ordinary skill in the art.

Alternative locking mechanisms and specimen support structure configurations may be contemplated for enabling an elongate core sample to be maintained, supported and locked in an upright position within the region of interest during imaging.

It will be understood that other rock specimens that are not considered elongate core samples, such as hand-sized chunks of rock not extracted by a core driller, may be placed into the region of interest of the device disclosed herein and accordingly imaged as described herein ultimately to produce three-dimensional models that may be viewed and manipulated as disclosed above.

What is claimed is:

1. A device for capturing digital images of a rock specimen in a region of interest, the device comprising:
    an inner chamber having a wall surrounding the region of interest, the chamber having a specimen support structure at the bottom of the region of interest and an open top opposite the specimen support structure, the specimen support structure dimensioned to receive and support an elongate core sample in an upright orientation within the region of interest;
    an imaging system associated with the chamber and comprising multiple digital imaging devices spaced around the region of interest, each digital imaging device oriented to have a respective field of view encompassing the region of interest;
    an illumination system associated with the chamber and switchable between a first illumination state and a second illumination state and comprising a plurality of illumination sources spaced around the region of interest, the illumination sources operable to direct intersecting illumination patterns into the region of interest; and
    a control system coordinating the imaging system and the illumination system to capture a first set of digital images during the first illumination state and a second set of images during the second illumination state.

2. The device of claim 1, wherein the specimen support structure comprises a locking mechanism for selectively locking and unlocking the elongate core sample within the specimen support structure.

3. The device of claim 1, wherein the imaging system comprises eight imaging devices.

4. The device of claim 1, wherein the illumination system comprises at least four illumination sources.

5. The device of claim 1, wherein the specimen support structure is dimensioned to receive and support both cylindrical and non-cylindrical elongate core samples in an upright orientation within the region of interest, wherein non-cylindrical elongate core samples includes quarter-cylinder, half-cylinder, three-quarter cylinder, and imperfect substantially-cylindrical core samples having various missing chips or fragments, and imperfect substantially quarter-cylinder, substantially half-cylinder, substantially three-quarter cylinder core samples with various missing chips or fragments.

6. The device of claim 1, wherein each of the illumination sources is a laser, and each respective illumination pattern is a set of parallel laser lines oriented at a respective angle thereby to, in combination, intersect with other sets of parallel laser lines from another illumination source.

7. The device of claim 6, wherein each laser is a red laser.

8. A method of capturing data from a rock specimen in a region of interest, the method comprising:
receiving and supporting an elongate core sample in an upright orientation within the region of interest;
projecting, from a plurality of directions, intersecting illumination patterns onto the core sample;
during the projecting, capturing a first set of digital images of the core sample from a plurality of perspectives;
de-activating the projecting and capturing a second set of digital images of the core sample from the plurality of perspectives; and
storing the first and second sets of digital images in association with each other.

9. The method of claim 8, further comprising:
receiving and supporting the elongate core sample in an upside-down upright orientation within the region of interest;
conducting the projecting, capturing, de-activating, capturing and storing steps with respect to the elongate core in the upside-down upright orientation.

10. The method of claim 8, further comprising:
providing ambient illumination of the core sample during capturing the second set of digital images.

11. The method of claim 9, wherein the ambient illumination is provided by two or more arrays of illumination sources arranged respectively as rings around the core sample.

12. The method of claim 8, wherein the capturing is conducted from at least four different perspectives.

13. The method of claim 8, wherein the capturing is conducted from eight different perspectives.

14. A method for processing data captured from a rock specimen, the data comprising a first set of images of the rock specimen captured while intersecting illumination patterns was being projected onto the rock specimen and a second set of images of the rock specimen without the illumination patterns, the method comprising:
generating a point cloud corresponding to the rock specimen, comprising:
generating a first subset of points by stereo matching using corresponding features within respective pairs of images in the first set;
generating a second subset of points by triangulating intersection points of intersecting illumination patterns in the images in the first set;
in the event that the number and distribution of generated points within one or more segments defined by intersecting illumination patterns does not accord with number and distribution of generated points within one or more adjacent segments, generating a third subset of points within the one or more segments using the first set of images; and
combining the subsets of points as the point cloud; and
mapping the images in the second set to a geometric structure defined by the point cloud thereby to form a three-dimensional model of the rock specimen.

15. The method of claim 14, further comprising:
prior to generating the third subset of points, image-enhancing the one or more segments thereby to enhance features within the one or more segments.

16. The method of claim 15, wherein the image-enhancing comprises:
conducting edge enhancement within the one or more segments.

17. The method of claim 15, wherein the image-enhancing comprises:
adjusting at least one of brightness and contrast within the one or more segments.

18. The method of claim 15, further comprising:
associating each point in the point cloud with its colour attribute obtained from the first set.

19. A system for generating a three-dimensional digital model comprising:
the device of claim 1; and
a computing system configured for receiving the first and second sets of digital images and for:
generating a point cloud corresponding to the core sample, comprising:
generating a first subset of points by stereo matching using corresponding features within respective pairs of images in the first set;
generating a second subset of points by triangulating intersection points of intersecting illumination patterns in the images in the first set;
in the event that the number and distribution of generated points within one or more segments defined by intersecting illumination patterns does not accord with number and distribution of generated points within one or more adjacent segments, generating a third subset of points within the one or more segments using the first set of images; and
combining the subsets of points as the point cloud; and
mapping the images in the second set to a geometric structure defined by the point cloud thereby to form a three-dimensional model of the core sample.

20. The system of claim 19, wherein the computing system comprises a user interface for displaying and manipulating the three-dimensional model.

21. A non-transitory computer readable medium embodying a computer program executable on a computing system for processing data captured from a rock specimen, the data comprising a first set of images of the rock specimen captured while intersecting illumination patterns was being projected onto the rock specimen and a second set of images of the rock specimen without the illumination patterns, the computer program comprising:
  computer program code for generating a point cloud corresponding to the rock specimen, comprising:
    generating a first subset of points by stereo matching using corresponding features within respective pairs of images in the first set;
    generating a second subset of points by triangulating intersection points of intersecting illumination patterns in the images in the first set;
    in the event that the number and distribution of generated points within one or more segments defined by intersecting illumination patterns does not accord with number and distribution of generated points within one or more adjacent segments, generating a third subset of points within the one or more segments using the first set of images; and
    combining the subsets of points as the point cloud; and
  computer program code for mapping the images in the second set to a geometric structure defined by the point cloud thereby to form a three-dimensional model of the rock specimen.

22. The non-transitory computer readable medium of claim 21, wherein the geometric structure is selected from the group consisting of a cylinder, a quarter-cylinder, a half-cylinder, and a three-quarter cylinder.

* * * * *